US006091178A

United States Patent [19]

Spangenberg

[11] Patent Number: 6,091,178

[45] Date of Patent: Jul. 18, 2000

[54] CARBON BRUSH FOR ELECTRIC FUEL PUMPS

[75] Inventor: Jurgen Spangenberg, Bad Vilbel, Germany

[73] Assignee: Deutsche Carbone AG, Frankfurt, Germany

[21] Appl. No.: 09/243,547

[22] Filed: Feb. 3, 1999

[30] Foreign Application Priority Data

Feb. 9, 1998 [DE] Germany ........................ 298 02 144 U

[51] Int. Cl.[7] ........................... H02K 13/10; H01R 39/26

[52] U.S. Cl. ............................................ 310/248; 310/251

[58] Field of Search ..................................... 310/248, 251, 310/252, 253

[56] References Cited

U.S. PATENT DOCUMENTS

| | | | |
|---|---|---|---|
| 1,028,964 | 6/1912 | Press | 310/248 |
| 1,352,408 | 9/1920 | Hood | 310/248 |
| 2,153,049 | 4/1939 | Myers | 310/248 |
| 3,467,846 | 9/1969 | Reille | 310/248 |
| 3,590,300 | 6/1971 | Moberly | 310/248 |
| 5,083,055 | 1/1992 | Hokanson | 310/248 |
| 5,402,027 | 3/1995 | Strobl | 310/239 |
| 5,414,319 | 5/1995 | Nowicki et al. | 310/248 |

*Primary Examiner*—Nestor Ramirez
*Assistant Examiner*—Burton S. Mullins
*Attorney, Agent, or Firm*—Dennison, Scheiner, Schultz & Wakeman

[57] ABSTRACT

An improvement to an electric fuel pump which includes an electric motor with a rotating commutator defining an axial direction, a radial direction and a tangential direction, and having a circumferential surface, and a carbon brush having a contact surface contacting the circumferential surface of the commutator. The brush includes a gap extending from the contact surface in a radial direction and further extending through the brush in the axial direction, the gap reducing flotation of the carbon brush caused by a layer of fuel drawn between the carbon brush and the commutator. In an alternate embodiment, the brush includes a pressure relief hole extending from the contact surface completely through the brush in the radial direction.

21 Claims, 3 Drawing Sheets

CARBON BRUSH FOR ELECTRIC FUEL PUMPS

BACKGROUND OF THE INVENTION

The invention relates to a carbon brush for electric fuel pumps.

In electric fuel pumps installed near the fuel to be pumped, fuels of relatively high viscosity, in particular diesel fuels, result in the problem that rotation of the commutator draws a layer of fuel between the commutator and the carbon brush. The carbon brush floats to the surface due to the resulting increase in banking-up pressure between the carbon brush and the commutator or collector and the fuel film. Contact between carbon brush and commutator is significantly reduced and increased wear on the entire commutation system—including both carbon brushes and commutator—may result.

SUMMARY OF THE INVENTION

The present invention is based on the task of reducing the flotation of the carbon brushes of electric fuel pumps, i.e. pumps with an electric motor featuring a commutator, and to maintain good commutation even when pumping high-viscosity fuels, in particular diesel fuels. The technical measures taken to ensure good contacting should be simple and, if possible, not be achieved at the expense of other drawbacks, such as increased friction due to higher carbon brush contact pressure at the commutator.

The invention fulfils this task by providing the brush with means for reducing the hydrodynamic flotation forces.

According to a first embodiment of the invention, said means for reducing the hydrodynamic forces is a gap in the carbon brush reaching up to the contact surface of the carbon and essentially axially and radially oriented.

The orientation of the gap thus formed is based on the insight that the hydrodynamic flotation forces between the carbon brush and the commutator increase disproportionately to the length of a continuous frictional surface, i.e. running surface in the tangential direction. The gap placed as per the invention divides the entire running surface of the carbon brush into smaller partial surfaces, thus significantly reducing the hydrodynamic flotation forces, i.e. the sum of the forces integrated via the partial surfaces, compared with an uninterrupted running surface with the same overall dimension as the sum of the partial surfaces.

According to one variation of this embodiment, the gap does not divide the carbon brush into two parts or extend up to the wire strand/cable pressed attachment point serving as the electrical connection for the carbon brush: said gap begins at the running surface and ends below the attachment point, so that the same number and arrangement of wire strands or cables are achieved for uninhibited production despite the gap.

It was determined that a tangential gap width of between 0.2 and 2 mm, depending on the viscosity of the liquid pumped, suffices to reduce the hydrodynamic flotation forces at the frictional contact surface.

The reductive effect of the gap on the hydrodynamic flotation forces can be further enhanced by additional improvements in carbon brush design:

One such improvement consists of parallel grooves in the contact surface, running in the tangential direction. The distance between the grooves is preferably between 0.5 and 1 mm in the axial direction and their depth in the radial direction is between 0.1 and 0.5 mm. The higher values reflect the requirements of high-viscosity diesel fuels.

According to another embodiment, the means for reducing flotation forces acting upon the carbon brush comprise at least one pressure relief hole running essentially radially from the carbon brush through to the contact surface. Two pressure relief holes at opposing tangents may suffice. Typical diameters for the pressure relief holes are between 0.5 and 2 mm, whereby the higher values reflect the requirements of high-viscosity diesel fuels.

All of the dimensions mentioned above ensure pressure relief and a reduced contact surface.

BRIEF DESCRIPTION OF THE DRAWINGS

The invention is explained below on the basis of the following figures.

The directions t, a and r, for a given carbon brush 18, respectively correspond to the direction tangential to the rotating contact part 17 (which includes a commutator 15), to the axial direction parallel to the axis of rotation 16 and to the radial direction with respect to the same axis of rotation 16 and with respect to the sliding electrical contact.

Figure 1:
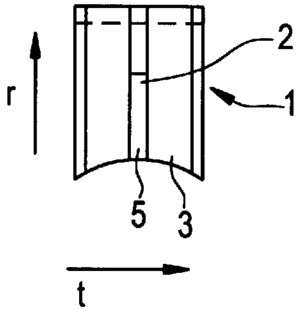
FIG. 1 illustrates a first embodiment of the carbon brush according to the invention, axial view.
Figure 2:
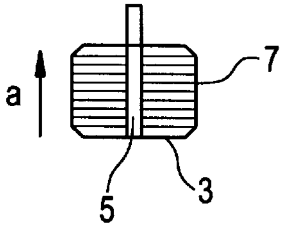
FIG. 2 shows a carbon brush as per FIG. 1, radial view of contact surface.

In FIG. 1, 1 designates a carbon brush with a cable 2 pressed into its side, which cable, at a non-designated pressed attachment point, runs essentially in the axial direction a. The carbon brush has a curved contact surface 3, adapted to the commutator or collector (not shown), and its upper side 4 on the side diametrically opposed to it.

Figure 3:
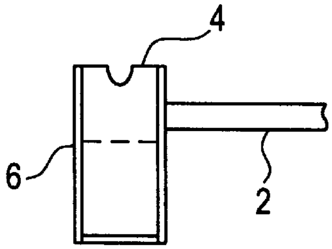
FIG. 3 shows a carbon brush as per FIGS. 1 and 2, lateral surface in tangential view.
Figure 4:
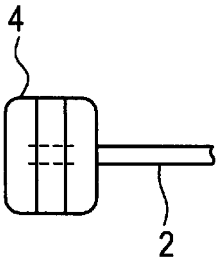
FIG. 4 shows a carbon brush as per FIGS. 1–3, with the upper side facing away from the contact surface in radial view.
Figure 5:
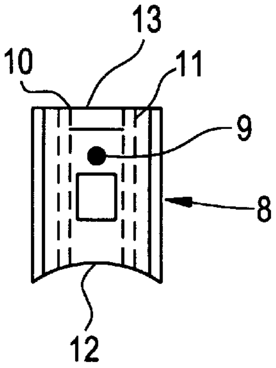
FIG. 5 illustrates a second embodiment of the carbon brush according to the invention, axial view.

The open gap 5 on the contact surface 3 extends all the way through in the axial direction a and upwards to the level of a solid line 6 in FIG. 3 below the pressed attachment point of the cable 2 in the radial direction r. The unobstructed dimension of the gap thus formed in a preferred version is 1 to 1.5 mm.

This means to reduce or avoid hydrodynamic flotation forces acting on the brush 1 is supplemented when the commutator 15 rotates under the brush due to ribbing or parallel grooves 7 in the contact surface 3 running in the tangential direction t; in this design example the distance currently preferred between the grooves is 0.7 mm with a groove depth of 0.3 mm. The grooves are placed at right angles to the direction of axial pressing of the carbon brush.

Figure 9:
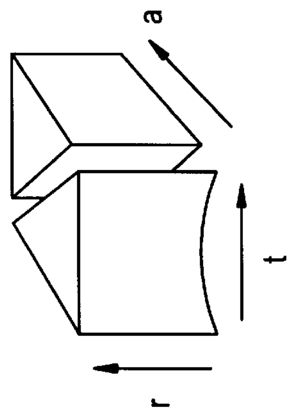
FIG. 9 shows a variation of the first embodiment according to the invention wherein the gap (or slot) runs diagonally.
Figure 10:
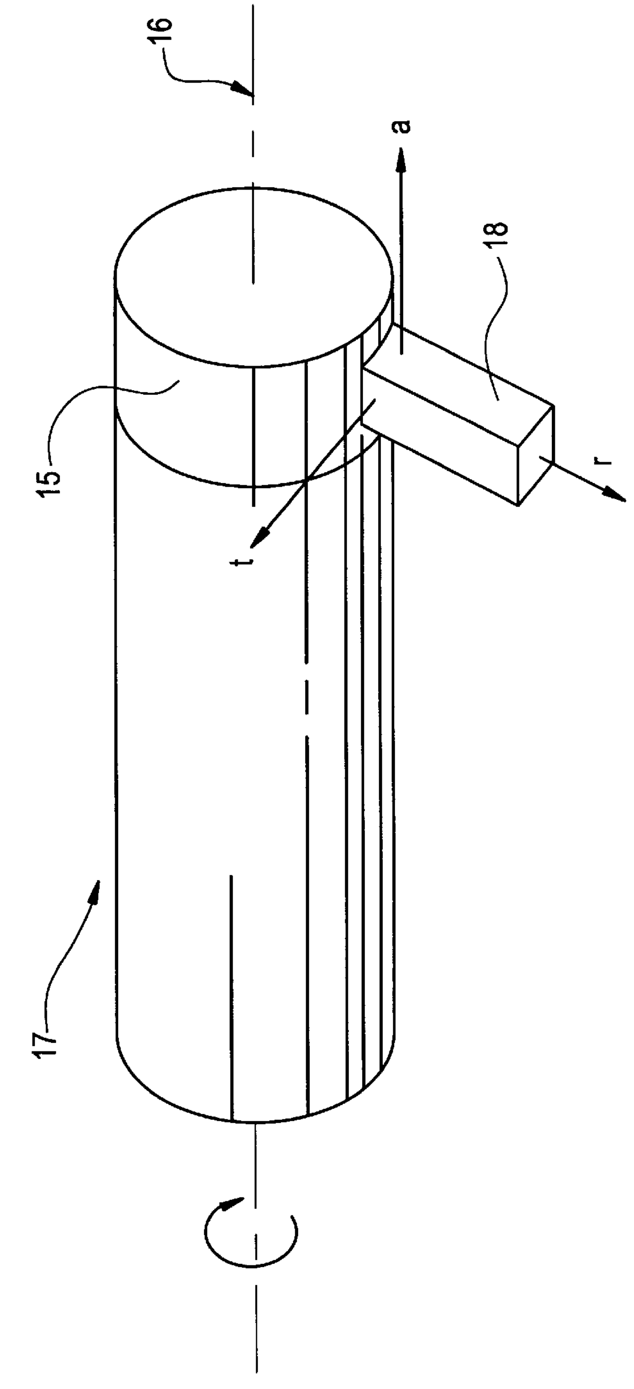
FIG. 10 schematically illustrates the configuration of a sliding electrical contact of an electrical motor and defines directions t, a and r.

The gap 5 may be diagonally oriented with respect to the t and a directions, as illustrated in FIG. 9.

Figure 6:
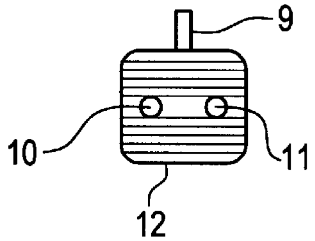
FIG. 6 shows a carbon brush as per FIG. 5, radial view of contact surface.
Figure 7:
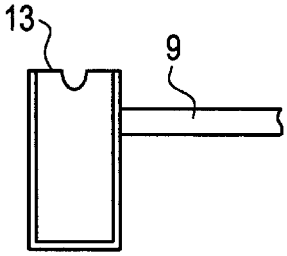
FIG. 7 shows a carbon brush as per FIGS. 5 and 6, lateral surface in tangential view.
Figure 8:
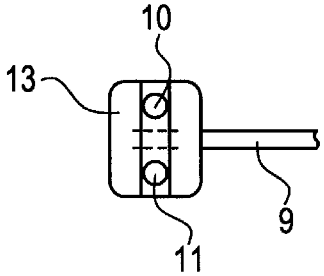
FIG. 8 shows a carbon brush as per FIGS. 5–7, but with the upper side of the carbon brush facing away from the contact surface in radial view.

The carbon brush 8 according to FIGS. 5–8 differs from the first design version as per FIGS. 1–4 in that the second design version of the carbon brush 8 features no gap with the pressed cable or wire strands 9, but rather two pressure relief holes 10, 11, which extend from the grooved contact surface 12 radially up to an upper surface 13 of the carbon brush, see also FIG. 8. The two pressure relief holes 10 and 11 are positioned, as seen in FIGS. 6 and 8, behind one another tangentially. In the design version shown they have a diameter of 2 mm.

The carbon brush may comprise both a gap according to the first embodiment of the invention and at least one pressure relief hole according to the second embodiment of the invention.

Figure 11:
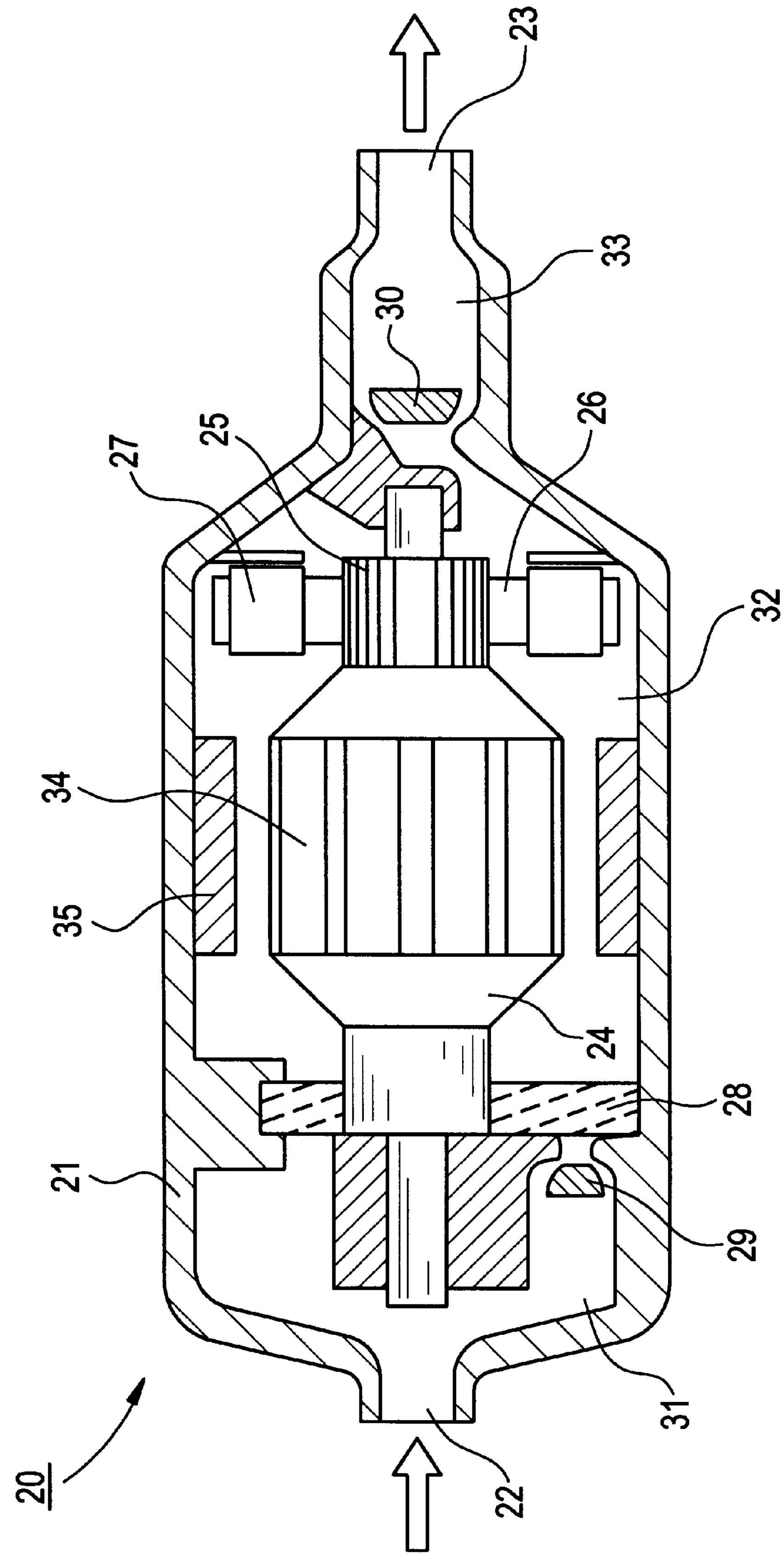
FIG. 11 is a cross-sectional view of a fuel pump including the brush of the invention.

FIG. 11 shows a typical fuel pump 20 incorporating the improvement of the invention, the fuel pump including a casing 21 having an inlet 22 and outlet port 23 for fuel. Further, the fuel pump includes cavities 31, 32 and 33 for circulation of fuel within the pump. In the central portion of the pump there is a rotor 24 entraining pumping means 28, such as a roller vane and driving means for transforming electrical energy into rotational motion. The driving means includes a commutator 25, brushes 26, armature 34 and magnet 35. The brushes 26 are supported by brush holders 27. The pump also includes valves 29 and 30.

What is claimed is:

1. In an electric fuel pump comprising an electric motor comprising a rotating commutator defining an axial direction, a radial direction and a tangential direction, and having a circumferential surface, and a carbon brush having a contact surface contacting the circumferential surface of the commutator, the improvement comprising a gap in the brush extending from the contact surface in the radial direction and further extending in through the brush in the axial direction, whereby the gap reduces flotation of the carbon brush caused by a layer of fuel drawn between the carbon brush and the commutator.

2. A fuel pump according to claim 1, additionally comprising an electrical contact wire pressed into a central portion of the brush, wherein the gap extends to a point between the contact surface and the wire.

3. A fuel pump according to claim 1, wherein the gap has a width of between 0.2 and 2 mm in the tangential direction.

4. A fuel pump according to claim 1, further comprising a plurality of parallel grooves in the contact surface extending in the tangential direction.

5. A fuel pump according to claim 4, wherein the parallel grooves are separated by a distance of between 0.5 and 1 mm in the axial direction and have a depth of between 0.1 and 0.5 mm.

6. A fuel pump according to claim 1, wherein the gap also extends in the tangential direction, such that the gap extends diagonally through the carbon brush.

7. A fuel pump according to claim 1, further comprising at least one pressure relief hole extending from the contact surface completely through the brush in the radial direction.

8. A fuel pump according to claim 7, comprising two said pressure relief holes.

9. A fuel pump according to claim 7, wherein said at least one pressure relief hole has a diameter of between 0.5 and 2 mm.

10. In an electric fuel pump comprising an electric motor comprising a rotating commutator defining an axial direction, a radial direction and a tangential direction, and having a circumferential surface, and a carbon brush having a contact surface contacting the circumferential surface of the commutator, the improvement comprising a pressure relief hole in the brush extending from the contact surface completely through the brush in the radial direction, whereby the pressure relief hole reduces flotation of the carbon brush caused by a layer of fuel drawn between the carbon brush and the commutator.

11. A fuel pump according to claim 10, comprising two said pressure relief holes.

12. A fuel pump according to claim 10, wherein said at least one pressure relief hole has a diameter of between 0.5 and 2 mm.

13. A carbon brush for use with a rotating commutator defining an axial direction, a radial direction and a tangential direction, and having a circumferential surface, the carbon brush having a contact surface contacting the circumferential surface of the commutator, the carbon brush further comprising at least one pressure relief hole extending from the contact surface completely through the brush in the radial direction.

14. A carbon brush according to claim 13, comprising at least two said pressure relief holes.

15. A carbon brush according to claim 13, wherein said at least one pressure relief hole has a diameter of between 0.5 and 2 mm.

16. A carbon brush according to claim 13, further comprising a gap in the brush extending from the contact surface in the radial direction and further extending in through the brush in the axial direction.

17. A carbon brush according to claim 16, additionally comprising an electrical contact wire pressed into a central portion of the brush, wherein the gap extends to a point between the contact surface and the wire.

18. A carbon brush according to claim 16, wherein the gap has a width of between 0.2 and 2 mm in the tangential direction.

19. A fuel pump according to claim 16, further comprising a plurality of parallel grooves in the contact surface extending in the tangential direction.

20. A fuel pump according to claim 19, wherein the parallel grooves are separated by a distance of between 0.5 and 1 mm in the axial direction and have a depth of between 0.1 and 0.5 mm.

21. A fuel pump according to claim 16, wherein the gap also extends in the tangential direction, such that the gap extends diagonally through the carbon brush.

* * * * *